United States Patent
Kwaterski

(10) Patent No.: US 9,988,124 B2
(45) Date of Patent: *Jun. 5, 2018

(54) SUSPENSION ASSEMBLY

(71) Applicant: Hayes Bicycle Group, Inc., Cedarburg, WI (US)

(72) Inventor: Edward C Kwaterski, Cedarburg, WI (US)

(73) Assignee: Hayes Bicycle Group Inc., Mequon, WI (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/823,857

(22) Filed: Aug. 11, 2015

(65) Prior Publication Data

US 2015/0344101 A1    Dec. 3, 2015

Related U.S. Application Data

(63) Continuation of application No. 13/481,109, filed on May 25, 2012, now Pat. No. 9,132,881.

(51) Int. Cl.
*F16F 9/32* (2006.01)
*B62K 25/08* (2006.01)
(Continued)

(52) U.S. Cl.
CPC ........... *B62K 25/08* (2013.01); *F16F 9/0218* (2013.01); *F16F 9/3228* (2013.01);
(Continued)

(58) Field of Classification Search
CPC ........ F16F 9/3228; F16F 9/0218; F16F 9/486; F16F 9/466; F16F 9/43; F16F 9/0209;
(Continued)

(56) References Cited

U.S. PATENT DOCUMENTS 2,212,759 A    8/1940 Tea
4,331,224 A    5/1982 Sano
(Continued)

*Primary Examiner* — Joseph M Rocca
*Assistant Examiner* — Daniel S Yeagley
(74) *Attorney, Agent, or Firm* — Zimmerman Intellectual Property Services LLC

(57) ABSTRACT

A suspension assembly is disclosed. The suspension assembly is configured for movement under compression when installed for use in a vehicle providing at least one wheel. The assembly comprises a leg; a compression rod assembly comprising a compression rod movable within the leg; a piston assembly comprising a seal and a piston; and an isolator configured to deform under compression to provide isolation between the compression rod assembly and the piston assembly. The compression rod can translate under compression with deformation of the isolator before movement of the piston. The suspension assembly may be configured to provide a response to a force such as compression. An isolation member between the compression rod assembly and the piston assembly may be configured so that a force imparted on the compression rod assembly compresses the isolation member without translation of the piston. A spring system comprises a leg, a piston assembly comprising a piston, a compression rod assembly comprising a compression rod, a gas chamber adjacent to the piston assembly, and an isolator configured to deform under compression of the compression rod without translation of the piston.

25 Claims, 2 Drawing Sheets

(51) Int. Cl.
*F16F 9/512* (2006.01)
*F16F 9/34* (2006.01)
*F16F 9/02* (2006.01)
*B62K 25/04* (2006.01)

(52) U.S. Cl.
CPC ............ *F16F 9/3415* (2013.01); *F16F 9/512* (2013.01); *F16F 9/5123* (2013.01); *B62K 2025/044* (2013.01)

(58) Field of Classification Search
CPC .. F16F 9/3415; F16F 9/50; F16F 9/512; F16F 9/5123; F16F 9/5126; F16F 9/516; F16F 9/5165; B62K 25/04; B62K 25/08
USPC ............ 188/297, 316, 313, 322.22, 321.11; 280/124.145, 124.154, 276
See application file for complete search history.

(56) References Cited

U.S. PATENT DOCUMENTS

| | | | |
|---|---|---|---|
| 4,433,759 A | * | 2/1984 | Ichinose ................. E05C 17/30 16/51 |
| 4,561,669 A | | 12/1985 | Simons |
| 4,791,712 A | | 12/1988 | Wells et al. |
| 6,095,541 A | | 8/2000 | Turner et al. |
| 6,105,988 A | | 8/2000 | Turner et al. |
| 6,592,136 B2 | | 7/2003 | Becker et al. |
| 7,451,860 B2 | | 11/2008 | Nevoigt et al. |
| 7,837,180 B2 | | 11/2010 | Jordan |
| 8,033,368 B2 | | 10/2011 | Becker et al. |
| 2003/0051957 A1 | | 3/2003 | Lemieux |
| 2004/0017035 A1 | | 1/2004 | Treder et al. |
| 2008/0041681 A1 | | 2/2008 | Shipman |
| 2009/0001684 A1 | | 1/2009 | McAndrews et al. |
| 2010/0314209 A1 | | 12/2010 | Gonzalez et al. |
| 2011/0083930 A1 | | 4/2011 | Laird et al. |
| 2011/0187076 A1 | | 8/2011 | Gonzalez et al. |

* cited by examiner

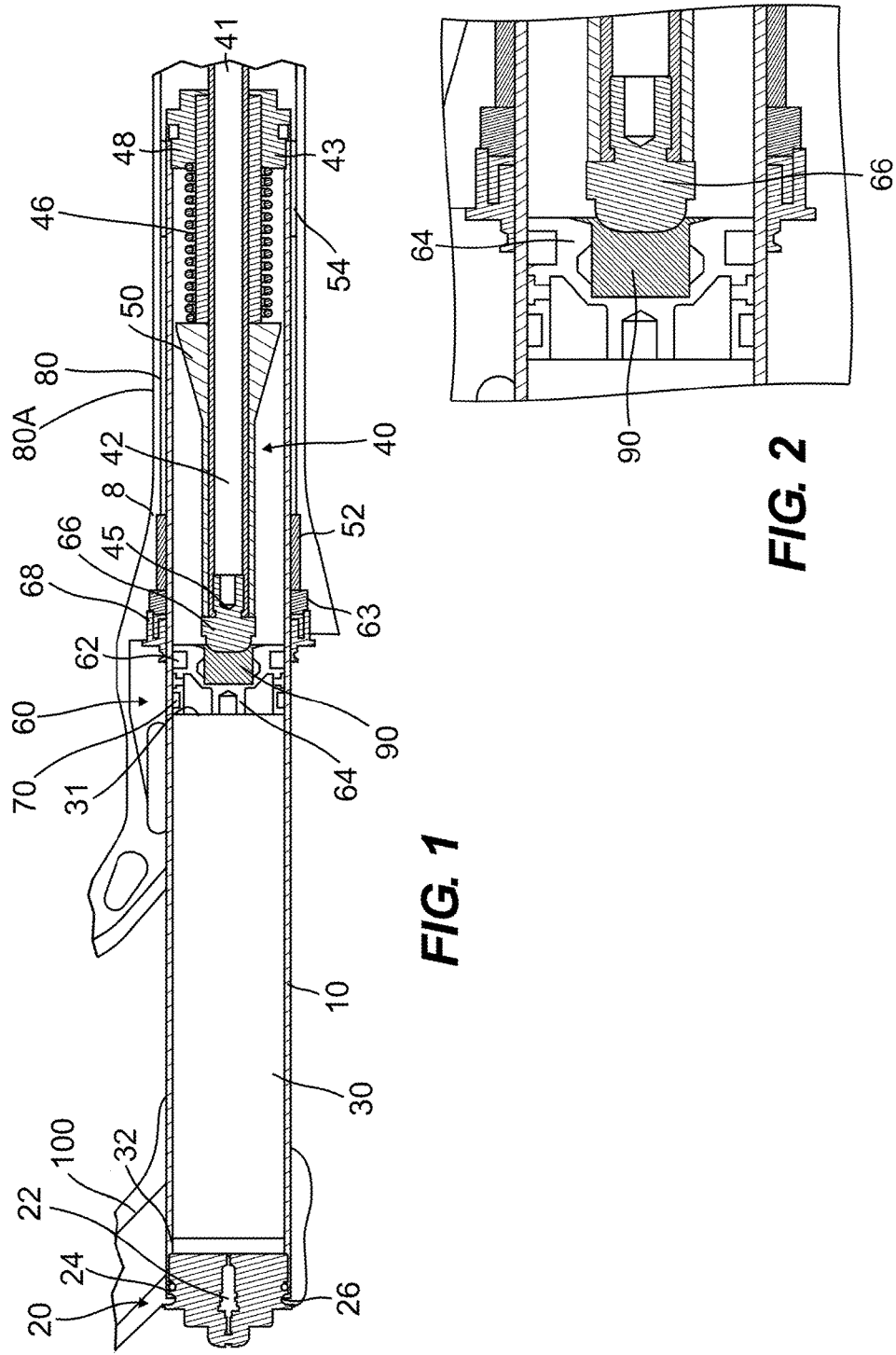

SUSPENSION ASSEMBLY

RELATED APPLICATION

The present application is a continuation of and claims priority to co-pending U.S. application Ser. No. 13/481,109 (U.S. Pat. No. 9,132,881) titled "RUBBER ISOLATION SYSTEM INCORPORATED BETWEEN THE COMPRESSION ROD AND THE GAS SPRING ASSEMBLY OF A BICYCLE FORK" (filed May 25, 2012) which is incorporated by reference.

FIELD

The present invention relates to the field of bicycle forks and in particular to the spring system incorporated into bicycle forks.

BACKGROUND

A bicycle fork is the portion of a bicycle that holds the front wheel and allows the rider to steer and balance the bicycle. A fork consists of two fork ends which hold the front wheel axle, two blades which join at the fork crown, and a steering tube which is attached to the handle bars.

On most mountain bicycles, the fork contains a set of shock absorbers so that the blades typically consist of upper and lower telescoping tubes which are called legs.

A portion of the legs is the shock absorber which usually consists of two parts: a spring and a damper. The spring can be a metal coil but more commonly is now compressed air. Air springs utilize the thermodynamic property of gasses that their pressures increase as they are compressed adiabatically. The spring constant can be adjusted by adjusting the air pressure. This allows a fork to be tuned to a rider's weight.

The damper usually forces oil to pass through one or more small openings in the suspension fork.

In a traditional system, the compression rod which is usually a hard material such as aluminum or plastic pushes directly on the piston. The piston also usually is made out of aluminum, plastic or similar material. Until the load in the compression rod exceeds the static friction of the piston assembly seal, the suspension does not compress. The result is an undesirable harshness.

U.S. Pat. No. 6,592,136 discloses a standard connection between a piston assembly and a compression rod assembly. U.S. Pat. No. 2,212,759 discloses rubber isolators 28 and 47.

There is a significant need for an improved suspension system in a bicycle fork that addresses the problems set forth.

SUMMARY

The system may comprise one or more of the inventive concepts and features shown and described in the FIGURES and specification.

The present invention is an isolator within a piston to reduce the transmission of high frequency/low amplitude vibration to the rider and eliminate piston seal breakaway harshness. The suspension consists of a telescoping leg within a lower casting. The leg contains a top cap assembly fixed to the leg, a piston assembly movable within the leg, and a lower cap assembly fixed to the leg. The piston assembly contains a seal which contacts the inside of the leg. The leg, top cap assembly and piston assembly define a pressurized gas chamber. A valve in the top cap assembly is fixed to allow adjustment of the gas pressure within the chamber. A compression rod assembly is fixed to the lower casting and contains a head that contacts an isolator within the piston assembly.

The compression rod assembly applies a load to the piston assembly when a bump is encountered. If the load is below the static friction between the piston assembly seal and fork leg, then the isolator deforms, allowing compression of the suspension without translation of the piston. Once the load exceeds the static friction of the piston assembly seal, the piston translates which reduces the volume of the gas chamber, resulting in a higher pressure.

The fork consists of a telescoping assembly with a spring system using a compressed air chamber. The compression rod moves upward with the wheel when a bump is encountered. This translates the piston, compressing the air chamber, resulting in a higher pressure. This creates a position dependent force, or spring. In a traditional system, the rod, which is usually a hard material like aluminum or plastic, pushes directly on the piston. The piston is also usually made of aluminum, plastic or similar material. In the present invention system, a rubber or other compliant member creates a buffer between the compression rod and piston.

The present invention relates to a suspension assembly configured for movement under compression when installed for use in a vehicle providing at least one wheel. The assembly comprises a leg; a compression rod assembly comprising a compression rod movable within the leg; a piston assembly comprising a seal and a piston; and an isolator configured to deform under compression to provide isolation between the compression rod assembly and the piston assembly. The compression rod of the compression rod assembly can translate under compression with deformation of the isolator before movement of the piston of the piston assembly.

The present invention also relates to a suspension assembly configured to provide a response to a force such as compression. The assembly comprises a compression rod assembly comprising a movable compression rod; a piston assembly comprising a movable piston; and an isolation member between the compression rod assembly and the piston assembly configured so that a force imparted on the compression rod assembly compresses the isolation member without translation of the piston.

The present invention also relates to a spring system. The system comprises a leg; a piston assembly comprising a piston; a compression rod assembly comprising a compression rod; a gas chamber adjacent to the piston assembly which is adjacent to the compression rod assembly; and an isolator configured to deform adjacent to the piston assembly and adjacent to the compression rod assembly. The isolator is configured to deform under compression of the compression rod without translation of the piston at the piston assembly.

The present invention has the following advantages:

The invention provides a soft connection between the compression rod and the piston, thereby isolating high frequency/low amplitude vibration; the invention eliminates harshness transmitted to the rider due to static friction of the piston seal; and the present invention reduces friction effects transmitted to the rider due to seal drag on the moving piston.

It is an object of the present invention to put a rubber piece between the end of the compression rod and the piston itself so that the rubber can compress and allow the wheel to move slightly before it has to break the seal friction and start the piston moving upwards. This has the biggest effect on low amplitude high frequency types of bumps.

It is a further object of the present invention to add a rubber seal around the OD of the piston that keeps the air captured in the chamber and there is a rubber cylinder pressed into the bottom of the piston and a compression rod contacts that rubber. That is the innovation. It is an isolator between the rod and the piston.

It is additionally an object of the present invention to lessen the transmission of harshness through to the rider. For example, if the piston seal creates five pounds of friction then that friction creates a step force that would transmit through to the rider before the tire can move upwards. By putting a compliant member between the compression rod and the piston it can allow the wheel to begin its movement before it has to break that friction and transfer the force to the piston.

Further novel features and other objects of the present invention will become apparent from the following detailed description, discussion and the appended claims, taken in conjunction with the drawings.

FIGURES

FIG. 1 is a side elevational view in partial cross-section of a suspension assembly for a bicycle fork according to an exemplary embodiment.

FIG. 2 is a detailed cross-sectional view of the suspension assembly of FIG. 1 illustrating the isolator in place between the piston and the compression rod assembly.

DESCRIPTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1A:
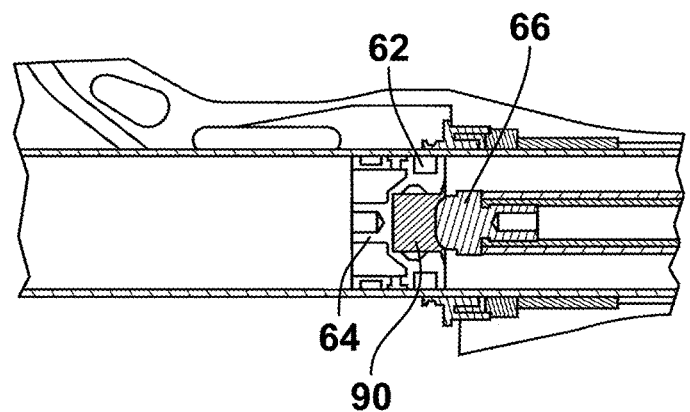
FIGS. 1A-1C are detailed cross-sectional views of the suspension assembly of FIG. 1 showing progressive operation of the isolator under force at the compression rod to overcome the static friction of the piston assembly.
Figure 1B:
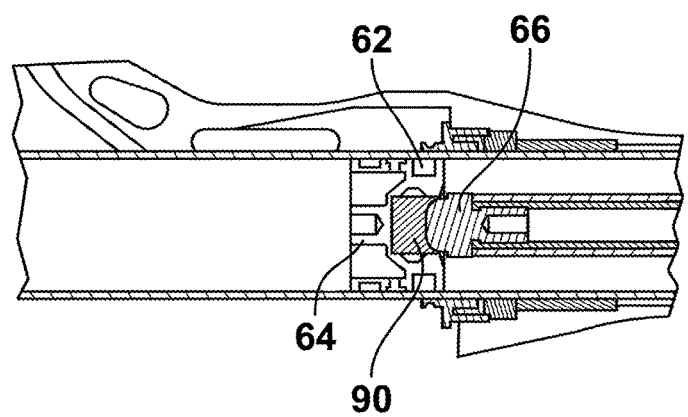
Figure 1C:
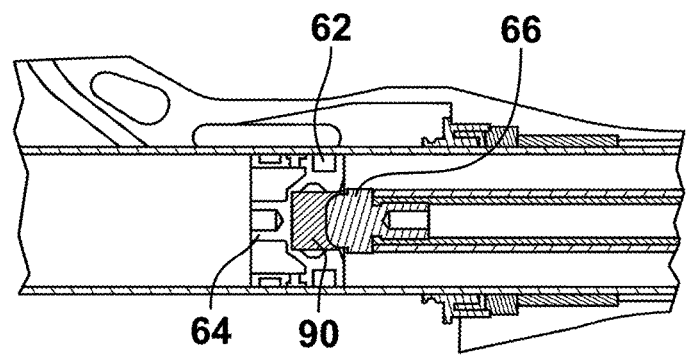

Referring to FIGS. 1 and 2, there is illustrated one-half of a bicycle fork leg 10 which includes conventional parts and the present invention incorporated into the fork leg 10. A conventional bicycle fork has two such fork legs 10 which are parallel to each other and supported by a crown 100. The crown is affixed to a steerer tube which in turn is affixed to handlebars.

The fork leg 10 includes a top cap assembly 20 which is fixed to the fork leg 10. The fork leg 10 (fixed to the top cap assembly) includes a pressurized gas chamber 30 which is filled with gas such as air and which acts as a shock absorbing spring. The top cap assembly 20 (with pressurized gas chamber 30) includes a valve 22 by which the amount of gas within the pressurized gas chamber can be adjusted and a seal 24 to seal the top end of the pressurized gas chamber 30. The valve 22 in the top cap assembly 20 is fixed to allow adjustment of the gas pressure within the chamber of the pressurized gas chamber 30. The valve 22 and seal 24 are incorporated into the top cap body 26 located at the top end 32 of the pressurized gas chamber 30.

The fork leg 10 also comprises a piston assembly 60 which is movable within the fork leg 10. The piston assembly 60 includes a seal 62 which contacts the inside 8 of the fork leg 10.

The piston assembly 60 also includes a piston body 64, a glide ring 70 and a rubber piece 90. Partially inserted into the fork leg 10 is a compression rod assembly 40 which includes a compression rod 42 which is movable up and down within the fork leg 10 and towards the pressurized gas chamber 30 when the wheel to which the fork leg 10 is attached hits a bump. To facilitate the up and down movement of the compression rod 42, the compression rod assembly 40 further comprises a top out spring 46 adjacent the lower end 41 of the compression rod assembly 40, which in turn is connected to a top out spacer 50. The compression rod assembly 40 further includes a head 66.

A lower casting 80 includes an upper bushing 52, a lower bushing 54, a foam ring 63, and a wiper 68 to facilitate movement of the leg 10. The glide ring 70 further facilitates movement of the piston 64 which is pushed by the isolator 90 which is pushed by the compression rod assembly 40. See FIG. 2 (showing detail of configuration of piston body and compliant member/isolator). The piston assembly 60 lies adjacent to the lower end 31 of the gas compression chamber 30. The lower end 48 of the fork leg 10 includes an end cap body 43.

The present invention is the rubber piece 90 more generally defined as a compliant member, which functions as an isolation member between the head 66 of top end 45 of the compression rod 42 and the piston 64 so that upon an upward movement of the compression rod 42, the rubber piece 90 can be compressed by a few millimeters. That is the innovation of the present invention. The rubber piece or cylinder 90 is an isolator between the compression rod 40 and the piston 64.

Discussed further, the present invention is to place a rubber piece 90 between the top end 45 of the compression rod 42 and the piston 64 so that the rubber 90 can compress a few millimeters which allows the wheel to move slightly before it has to break the seal friction required for piston movement. This invention is expected to have the highest effect on low magnitude high frequency types of bumps.

The insertion of the rubber piece 90 provides a soft connection between the compression rod assembly 40 and the piston assembly 60, thereby isolating high frequency, low amplitude vibrations.

In summary, the fork consists of a telescoping assembly with the spring system using a compressed air chamber 30. A compression rod 42 moves with a wheel to which the fork is attached when a bump is encountered by the wheel. This upward movement of the compression rod 42 translates to a piston 64, compressing the air chamber 30, resulting in a higher pressure.

The suspension consists of a fork leg 10 telescoping within the lower casting 80. The fork leg 10 contains a top cap assembly 20 fixed to the fork leg 10, a piston assembly 60 movable within the fork leg 10 and a lower cap assembly 43 affixed to the fork leg 10. The piston assembly 60 contains a seal 62 which contacts the inside of the fork leg 10. The fork leg 10, top cap assembly 20 and piston assembly 60 define a pressurized gas chamber 30. A valve 22 in the top cap assembly 20 allows adjustment of the gas pressure within the chamber. A compression rod assembly 40 is fixed to the lower casting and contains a head 66 that contacts the rubber piece 90 within the piston assembly 60.

The lower casting is illustrated with the inner surface of the lower casting numbered 80 and the outer surface of the lower casting numbered 80A.

The compression rod assembly 40 applies a load to the piston assembly 60 when a bump is encountered. If the load is below the static friction of the piston seal 62, the rubber piece 90 deforms, allowing compression of the suspension without translation of the piston body 64. Once the load exceeds the static friction of the piston seal 62, the piston body 64 translates which reduces the volume of the pressurized gas chamber 30 resulting in a higher pressure.

According to an exemplary embodiment, the suspension assembly for a bicycle fork leg comprises a top cap assembly including a pressurized gas chamber which functions as a shock absorbing spring. The pressurized gas chamber comprises a valve by which the amount of gas within the pressurized gas chamber is adjusted. A seal is provided to seal a top end of the pressurized gas chamber. The valve and seal incorporated into the top cap assembly is located at a top end of the pressurized gas chamber. A piston assembly is provided including a piston body and a piston head and a wiper, the piston assembly lies adjacent to a lower end of the gas compression chamber. A compression rod assembly is provided which is movable up and down within the fork leg and towards the pressurized gas chamber. A top out spring is provided adjacent a lower end of the compression rod assembly. The compression assembly is affixed to a lower casting. A rubber piece is inserted within the piston assembly and between the compression rod assembly and the piston assembly. A seal is provided around and outside of the piston (and in contact with an inside of the leg) to keep gas contained in the pressurized gas compression chamber; the rubber piece functions as an isolator between the compression rod assembly and the piston assembly to isolate low amplitude high frequency vibrations.

According to an exemplary embodiment, the suspension assembly for a fork with a fork leg comprises a rubber member inserted between a movable compression rod assembly and a piston assembly within the fork leg. Movement of the compression rod assembly toward the piston assembly causes the compression rod assembly to compress the rubber member; the rubber member acts as an isolator to isolate low amplitude high frequency forces imparted to the fork.

According to an exemplary embodiment, the suspension assembly for a bicycle fork leg, comprises a telescoping assembly of a compressed air chamber serving as a spring member slidably connected to a lower casting. The assembly comprises a compression rod assembly including a compression rod which moves with a wheel to which the bicycle fork is attached when a bump is encountered by the wheel. Movement causes the compression rod to move toward a piston assembly including a piston adjacent the compressed air chamber. The piston assembly comprises a compliant member positioned within the piston between the piston and the compression rod so that when a bump is encountered the compression rod exerts a load to the piston assembly; if the load is below the static friction of the piston assembly, the compliant member deforms allowing compression of the fork without translation of the piston; and once the load exceeds the static friction of the piston assembly the piston translates which reduces the volume of gas in the pressurized gas chamber. The bicycle fork leg further comprises a compliant member made of rubber.

According to an exemplary embodiment, the suspension assembly for a fork leg comprises a pressurized gas chamber adjacent to a piston assembly which is adjacent to a compression rod assembly including a movable compression rod. The assembly comprises a compliant member within the piston adjacent to an end of the movable compression rod; a force causes the compression rod to compress the compliant member; the complaint member reduces high frequency low amplitude vibration. The fork leg further comprises a compliant member made of rubber.

According to an exemplary embodiment, the suspension assembly for a fork leg comprises a piston which comes in contact with a pressurized gas chamber which serves as a shock absorber and an isolation member within the piston. A force on the fork causes a movable compression rod to compress the isolation member within the piston; the isolation member absorbs the compression rod force and reduces movement of the piston toward the pressurized gas chamber, thereby reducing high frequency low amplitude vibrations to the fork leg. The fork leg further comprises a compliant member made of rubber.

The key to the present invention is an isolator within a piston to reduce the transmission of high frequency amplitude vibration to the rider and eliminate piston seal breakaway harshness.

In a traditional system, the compression rod 42 which is usually a hard material like aluminum or plastic pushes directly on the piston body 64, also usually made of aluminum, plastic or similar material. The innovation of the present invention is the insertion of a rubber or other compliant member to create a buffer between the compression rod 42 and the piston body 64.

Of course the present invention is not intended to be restricted to any particular form or arrangement, or any specific embodiment, or any specific use, disclosed since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The invention claimed is:

1. A suspension assembly configured for movement under compression when installed for use in a vehicle providing at least one wheel comprising:
   (a) a leg;
   (b) a compression rod assembly comprising a compression rod movable within the leg;
   (c) a piston assembly comprising a seal and a piston;
   (d) an isolator adjacent to the compression rod and adjacent to the piston and configured to separate the compression rod from the piston and to deform under compression to provide isolation between the compression rod assembly and the piston assembly;
      wherein the compression rod of the compression rod assembly can translate under compression with deformation of the isolator before movement of the piston of the piston assembly.

2. The suspension assembly of claim 1 further comprising a gas chamber; wherein the piston assembly is configured to operate against a pressure force from the gas chamber.

3. The suspension assembly of claim 1 wherein the isolator comprises a compliant member.

4. The suspension assembly of claim 1 configured wherein a static friction is developed between the seal of the piston assembly and the leg; and configured wherein the isolator isolates the compression rod from the piston until the static friction is overcome under compression.

5. The suspension assembly of claim 4 further comprising a gas chamber configured to provide a pressure force; wherein the piston of the piston assembly is configured to operate against the pressure force from the gas chamber.

6. The suspension assembly of claim 4 wherein the isolator comprises a rubber member.

7. The suspension assembly of claim 4 wherein the vehicle comprises a bicycle comprising a bicycle fork; and wherein the at least one wheel comprises a wheel secured to the bicycle fork.

8. The suspension assembly of claim 4 configured wherein a bump encountered by the wheel to cause compression at the wheel will cause the compression rod assembly to move toward the piston and transmit a force to the piston assembly; and wherein under a load from the force the isolator deforms without translation of the piston until the static friction provided by the seal at the piston assembly is overcome.

9. The suspension assembly of claim 1 wherein the compression rod assembly comprises a head configured to engage the isolator; wherein the compression rod and the head of the compression rod assembly are configured to move in response to movement of the at least one wheel.

10. A suspension assembly configured to provide a response to a compression force comprising:
    (a) a compression rod assembly comprising a movable compression rod and a head;
    (b) a piston assembly comprising a movable piston;
    (c) an isolation member between the head of the compression rod assembly and the piston assembly configured to separate the compression rod from the piston and configured so that a force imparted on the compression rod assembly compresses the isolation member without translation of the piston.

11. The suspension assembly of claim 10 comprising a gas chamber; wherein the piston assembly operates under a force provided by the gas chamber.

12. The suspension assembly of claim 10 wherein the isolation member is made of rubber.

13. The suspension assembly of claim 10 comprising a bicycle fork.

14. The suspension assembly of claim 10 wherein the piston assembly comprises the piston and a seal.

15. The suspension assembly of claim 14 wherein the seal provides a static friction for the piston assembly.

16. The suspension assembly of claim 15 wherein the piston is configured to move when the static friction provided by the seal is overcome by a force on the compression rod; and wherein the isolation member is configured to enable the compression rod to move without translation of the piston until the static friction provided by the seal is overcome.

17. The suspension assembly of claim 10 wherein the force is at least one of a low amplitude force and a high frequency force.

18. A spring system comprising:
    (a) a leg;
    (b) a piston assembly comprising a piston;
    (c) a compression rod assembly comprising a compression rod;
    (d) a gas chamber adjacent to the piston assembly which is adjacent to the compression rod assembly;
    (e) an isolator configured to separate the piston and the compression rod and to deform adjacent to the piston assembly and adjacent to the compression rod assembly;
    wherein the isolator is configured to deform under compression of the compression rod without translation of the piston at the piston assembly.

19. The spring system of claim 18 wherein the isolator comprises a compliant member.

20. The spring system of claim 18 wherein the isolator comprises a rubber member.

21. The spring system of claim 18 wherein the compression rod assembly comprises the compression rod and a head; wherein the head of the compression rod is configured to contact the isolator.

22. The spring system of claim 21 further comprising a pressurized gas chamber; wherein the compression rod is movable up and down within the leg and towards the pressurized gas chamber; and wherein the isolator comprises a compliant member between the head of the compression rod and the piston assembly; and wherein the compliant member is configured to isolate low amplitude high frequency vibration at the compression rod from the piston assembly.

23. The spring system of claim 18 configured to operate as a suspension system.

24. The spring system of claim 23 wherein the suspension system comprises a bicycle fork providing the leg.

25. The spring system of claim 18 further comprising a top out spring facilitating movement of the compression rod.

* * * * *